US006903341B2

(12) United States Patent
Imai et al.

(10) Patent No.: US 6,903,341 B2
(45) Date of Patent: Jun. 7, 2005

(54) APPARATUS FOR GENERATING TERAHERTZ WAVE AND TUNING METHOD

(75) Inventors: Kazuhiro Imai, Sendai (JP); Kodo Kawase, Wako (JP); Hiromasa Ito, Sendai (JP)

(73) Assignee: Riken, Saitama (JP)

( * ) Notice: Subject to any disclaimer, the term of this patent is extended or adjusted under 35 U.S.C. 154(b) by 34 days.

(21) Appl. No.: 10/406,605

(22) Filed: Apr. 4, 2003

(65) Prior Publication Data

US 2003/0227668 A1 Dec. 11, 2003

(30) Foreign Application Priority Data

Apr. 9, 2002 (JP) ....................................... 2002/106561

(51) Int. Cl.[7] .............................. G02F 1/39; G02F 1/35
(52) U.S. Cl. ........................ 250/340; 359/330; 359/326
(58) Field of Search .......................... 250/340; 359/330, 359/326

(56) References Cited

U.S. PATENT DOCUMENTS 5,532,868 A * 7/1996 Gnauck et al. ............. 359/332
6,288,832 B1 9/2001 Richman et al.
6,697,186 B2 * 2/2004 Kawase et al. ............. 359/330
2002/0024718 A1 2/2002 Kawase et al.

OTHER PUBLICATIONS

B.A. Richman et al.: "All–Prism Achromatic Phase Matching for Tunable Second–Harmonic Generation", Article, May 20, 1999, pp. 3316–3323, vol. 38, Issue 15, Applied Optics, Optical Society of America, Washington, U.S.
O.E. Martinez: "Achromatic Phase Matching for Second Harmonic Generation of Femtosecond Pulses", Article, Dec. 1, 1989, pp. 2464–2468, vol. 25, Issue 12, IEEE Journal of Quantum Electronics, IEEE Inc. New York, U.S.
European Search Report completed Jul. 7, 2003 in EP 03 00 7799 including an English Language Abstract of EP 03 00 7799.

* cited by examiner

*Primary Examiner*—John R. Lee
*Assistant Examiner*—Erin-Michael Gill
(74) *Attorney, Agent, or Firm*—Griffin & Szipl, P.C.

(57) ABSTRACT

There are disclosed a nonlinear optical crystal 1 which can generate a THz wave by a parametric effect; a pump light incidence apparatus 12 for allowing a pump light 2 to be incident upon the nonlinear optical crystal; and a seed light injection apparatus 14 for injecting a seed light 5 having a variable frequency in a generation direction of an idler light 3 generated by the pump light. The seed light injection apparatus 14 comprises angle dispersion compensation means 16 set so that an incidence angle $\theta_{IN}$ of the seed light upon the nonlinear optical crystal 1 substantially equals to a desired phase matching condition regardless of a wavelength.

7 Claims, 13 Drawing Sheets

APPARATUS FOR GENERATING TERA-HERTZ WAVE AND TUNING METHOD

BACKGROUND OF THE INVENTION

1. Technical Field of the Invention

The present invention relates to an apparatus for generating a tera-Herz wave, and a tuning method of the apparatus.

2. Description of the Related Art

A region of a far-infrared radiation or sub-millimeter wave having a frequency range of 1 to 3 THz is positioned in a light wave-radio wave interface and so its field has been left undeveloped both in technology and application in contrast to the light wave and the radio wave, which have been developed in their own fields. This field of far-infrared radiation or sub-millimeter wave, however, has been more and more important in effective utilization of a frequency band (1 to 3 THz) in wireless communications, accommodation of ultra-high communications, environmental measurement by use of imaging or tomography utilizing properties of an electromagnetic wave in such a frequency band, and application to biology and medicine. Hereinafter, a far-infrared radiation and a sub-millimeter wave in the frequency band (1 to 3 THz) is called a "THz wave".

FIG. 1A is an illustration showing a principle for generating the THz wave. In the figure, reference numeral 1 indicates nonlinear optical crystal (e.g., $LiNbO_3$), 2 indicates a pump light (e.g., YAG laser beam), 3 indicates an idler light, and 4 indicates a THz wave.

When the pump light 2 is incident upon the nonlinear optical crystal 1 having Raman and far-infrared activities in a constant direction, an Stimulated Raman Scattering effect (or parametric interaction) generates the idler light 3 and THz wave 4 through an elementary excitation wave (polariton) of a material. In this case, an energy conservation law represented by Equation (a) and momentum conservation law (phase matching condition) represented by Equation (b) are established among the pump light 2 ($\omega_p$), THz wave 4 ($\omega_T$), and idler light 3 ($\omega_i$). It is to be noted that Equation (b) represents a vector relationship and a non-collinear phase matching condition can be represented as shown in the upper right of FIG. 1A.

$$\omega_p=\omega_T+\omega_i \quad \text{(a)}$$

$$\kappa_p=\kappa_T+\kappa_i \quad \text{(b)}$$

The idler light 3 and THz wave 4 generated at this time have a spatial spread and their wavelengths change continuously in accordance with their outgoing angles. The generation of the broad idler light and THz wave in this single-path arrangement is called THz-wave parametric generation (TPG).

It is to be noted that a basic optical parametric process is defined as annihilation of one pump photon and simultaneous generation of one idler photon and one signal photon. When the idler or signal light resonates and if the intensity of the pump light exceeds a constant threshold, parametric oscillation occurs. Moreover, the annihilation of one pump photon and simultaneous generation of one idler photon and one polariton are combined to constitute Stimulated Raman Scattering scattering, which is included in parametric interaction in a broad sense.

As described above, in FIG. 1A, the pump light 2 including a Z-axis polarized light and having a frequency $\omega_p$ is incident upon the $LiNbO_3$ crystal which is the nonlinear optical crystal 1. Then, by parametric wavelength conversion, the idler light 3 (frequency $\omega_i$) having a frequency slightly lower than that of the pump light 2, and the THz wave 4 (frequency $\omega_T$) whose frequency equals to a difference of the frequency between the pump and idler lights are generated. Moreover, outgoing directions of the idler light and THz-wave beam are given by the non-collinear phase matching condition (angles $\theta$, $\phi$), and have angles which slightly differ with each wavelength.

However, when only the pump light 2 is injected into the crystal 1, the idler light 3 and THz wave 4 are spontaneously emitted lights generated from parametric noises, and a spectrum line width therefore reaches several hundreds of GHz and is remarkably broad. Moreover, the generated THz wave is very faint and has a problem that its major part is absorbed in the nonlinear optical crystal when it goes through it by several hundreds of micrometers.

FIG. 1B is a principle diagram of an injection-seeded THz-wave parametric generator (is-TPG) which solves the problem (Japanese Patent Application Laid-Open No. 2002-72269). In this is-TPG, a seed light 5 whose frequency is lower than the pump light 2 by 1 to 3 THz and whose spectrum line width is narrow is injected as a seed of idler light generation into the $LiNbO_3$ crystal 1. Thereby, the spectrum line width of the THz wave, which corresponds to the difference frequency between the pump light 2 and idler light 3, is narrowed.

FIG. 2 is a configuration diagram of the related-art is-TPG based on the above-described principle. In this diagram, a light source of the pump light 2 is an Nd:YAG laser which has a fixed wavelength and single frequency, and a light source of the seed light 5 is a semiconductor laser whose wavelength is variable. The seed light 5 is reflected by reflection mirrors M1, M2 and injected into the $MgO{:}LiNbO_3$ crystal 1 with a slight angle ($\theta_{IN}$) to the pump light 2.

According to the method and apparatus of FIGS. 1B and 2, a second laser device is used to inject the seed light 5 in a generation direction of the idler light 3 generated by the pump light. Therefore, a more intense idler light can be generated as compared in the generation of the idler light 3 in the nonlinear optical crystal only by the spontaneous emission. Thereby, it has been confirmed that the light intensity of the idler light 3 of this direction and the intensity of the THz wave 4 satisfying the non-collinear phase matching condition is also greatly enhanced.

Moreover, directivity of the idler light 3 is high, and the laser beam is used in both the pump light 2 and seed light 5. Therefore, not only it has similarly been confirmed that the directivity of the generation direction of the generated THz wave 4 is enhanced but also the spectrum width can also greatly be narrowed.

However, for the tuning of the THz-wave frequency, since an incidence angle $\theta_{IN}$ of the seed light 5 satisfies the non-collinear phase matching, the incidence angle $\theta_{IN}$ has to be adjusted in accordance with the variable wavelength of the seed light 5.

For example, in the above-described THz-wave generation apparatus, when the THz wave is greatly changed, for example, in a frequency range of 1 to 2.5 THz, a y-axis stage and mirror M1 need to be manually finely adjusted so as to allow the seed light beam to intersect with the pump light beam at an optimum angle (e.g., 1 to 2.5°) in a point A on a $LiNbO_3$ crystal incidence plane. Therefore, the related-art THz-wave parametric generator requires time and labor in tuning the frequency, and there is a problem that it is difficult to incorporate the unit into spectrometer.

It is to be noted that an allowable range of the seed light incidence angle is about ±0.16°. Therefore, when a narrow width of about 300 GHz or less is adjusted, the incidence angle adjustment is not necessary, and it is possible to tune the THz wave only by the adjustment of the seed light frequency.

Moreover, FIG. 3 is a principle diagram of the THz-wave generation apparatus in which a beam deflection element and confocal optical system are used (Japanese Patent Application No. 2001-187735, not laid open). This beam deflection element 6 can control the incidence angle of the pump light at a high speed. When the same beam deflection element and confocal optical system are applied to the seed light, the incidence angle of the seed light beam can be adjusted with one mirror. However, even when the beam deflection element is used, in order to maintain the injection-seeding, it is necessary to constantly monitor the seed light wavelength and to control a laser beam scanner outgoing angle. There is a disadvantage that the system becomes complicated.

SUMMARY OF THE INVENTION

The present invention has been developed to solve these problem. That is, an object of the present invention is to provide a THz-wave generation apparatus and tuning method in which a frequency of a injection-seeded THz-wave parametric generator (is-TPG) using non-collinear phase matching can substantially automatically be tuned, thereby it is not necessary to adjust an incident angle for every change of a seed light wavelength, and the frequency of a THz wave can remarkably easily be tuned at a high speed.

According to the present invention, there is provided a THz-wave generation apparatus comprising: a nonlinear optical crystal (1) which can generate a THz wave by a parametric effect; a pump light incidence apparatus (12) for allowing a pump light (2) to be incident upon the nonlinear optical crystal; and a seed light injection apparatus (14) for injecting a seed light (5) having a variable frequency in a generation direction of an idler light (3) generated by the pump light, wherein the seed light injection apparatus (14) comprises angle dispersion compensation means (16) in which an incidence angle $\theta_{IN}$ of the seed light upon the nonlinear optical crystal (1) is set so as to substantially equal to a desired phase matching condition regardless of a wavelength.

Moreover, according to the present invention, there is provided a tuning method of a THz-wave generation apparatus for allowing a pump light (2) to be incident upon a nonlinear optical crystal (1) which can generate a THz wave by a parametric effect and for generating an idler light (3) and THz wave (4) in a direction in which a non-collinear phase matching condition is satisfied, the method comprising the steps of: injecting a seed light (5) having a variable frequency in a generation direction of the idler light; and combining a wavelength dispersion element (17) for dispersing an optical path because of a difference of a wavelength of the seed light with a dispersion enlargement/reduction element (18) for enlarging or reducing the dispersed optical path to constitute angle dispersion compensation means (16) so that an incidence angle $\theta_{IN}$ of the seed light upon the nonlinear optical crystal (1) substantially equals to a desired phase matching condition regardless of the wavelength.

According to the apparatus and method of the present invention, the angle dispersion compensation means (16) for compensating for the wavelength dispersion of the nonlinear optical crystal (1) in an incidence path of the seed light (5) of is-TPG allows the incidence angle of the injected seed light to equal to the phase matching condition regardless of the wavelength. Therefore, it is unnecessary to adjust an incident angle for every time the wavelength of the seed light is changed, and the THz-wave frequency can remarkably easily be tuned at the high speed.

According to a preferred embodiment of the present invention, the angle dispersion compensation means (16) is constituted of the wavelength dispersion element (17) in which the optical path is dispersed by the difference of the wavelength of the seed light and the dispersion enlargement/reduction element (18) which enlarges or reduces the dispersed optical path.

According to the constitution, the wavelength dispersion element (17) and dispersion enlargement/reduction element (18) can satisfy Equation (1) described later, and can substantially automatically tune the frequency. Thereby, it is unnecessary to adjust the incident angle every time the seed light wavelength is changed.

Moreover, the wavelength dispersion element (17) is a diffraction grating, prism, or combination of these, and the dispersion enlargement/reduction element (18) is a lens, concave surface mirror, parabolic mirror, or combination of these.

As described later in an embodiment, by the diffraction grating, prism, or combination of these, the optical path can be dispersed because of the difference of the wavelength of the seed light. Moreover, by the lens, concave surface mirror, paraboloid mirror, or combination of these, the dispersed optical path can be enlarged or reduced at a desired magnification.

The dispersion enlargement/reduction element (18) is a confocal optical system (20) for collecting a laser beam passed through a first focal point $f_1$ on a second focal point $f_2$ positioned in an incidence plane of the nonlinear optical crystal.

Moreover, the confocal optical system (20) is constituted of a first convex lens system (**21*a*) having a focal length $f_1$ and second convex lens system (21*b***) having a focal length $f_2$, the first and second convex lens systems are coaxially positioned at an interval of a sum $f_1+f_2$ of the focal lengths, and thereby the first and second convex lens systems share a focal point position in an intermediate position.

According to the constitution, the magnification of the dispersion enlargement/reduction element (18) is set to $f_1/f_2$ times, and the dispersed optical path can freely be enlarged or reduced.

The other objects and advantageous features of the present invention will be apparent from the following description taken in conjunction with the accompanying drawings.

DESCRIPTION OF THE PREFERRED EMBODIMENT

Figure 1A:
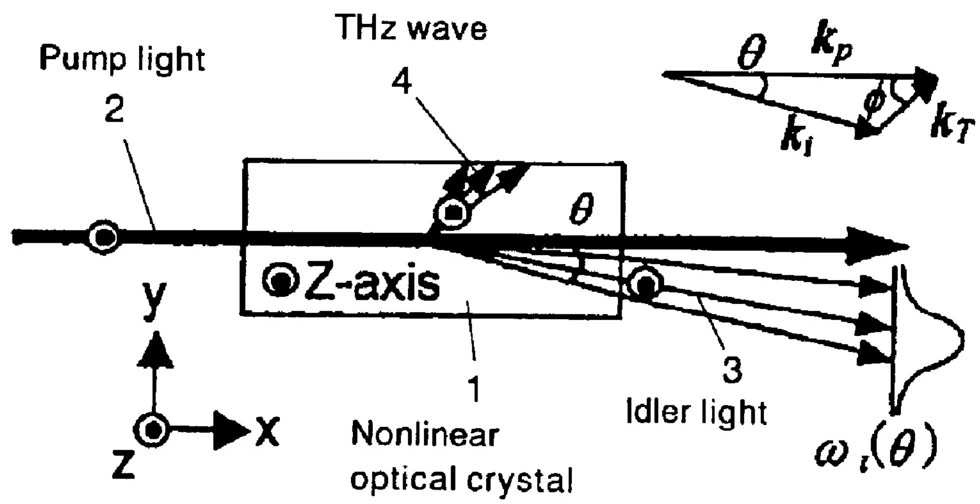
FIGS. 1A and 1B are diagrams showing a principle for generating a THz wave.

Preferred embodiments of the present invention will be described hereinafter with reference to the drawings. It is to be noted that in the drawings common parts are denoted with the same reference numerals to avoid redundant description.

Figure 4:
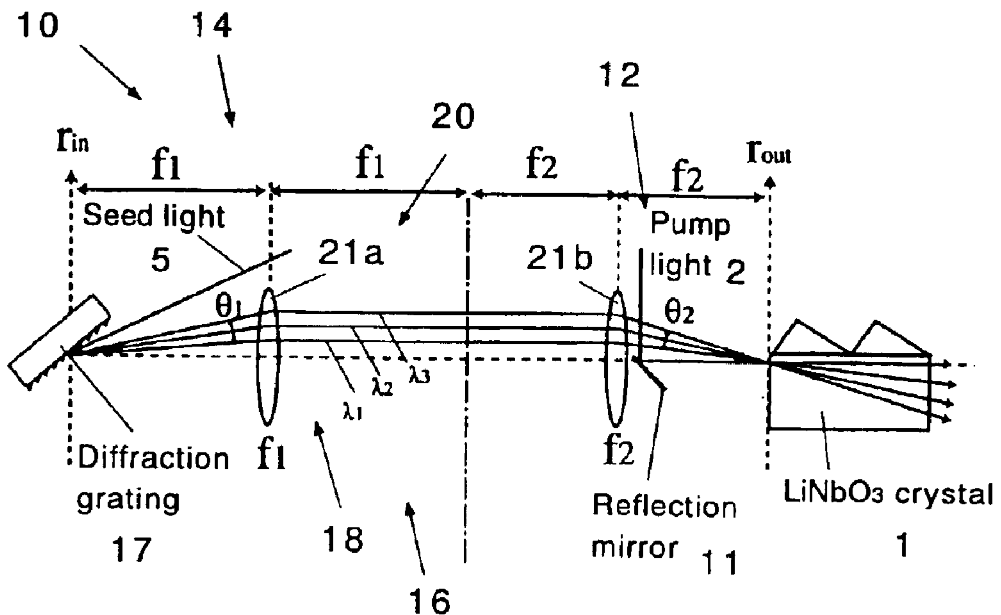
FIG. 4 is a diagram showing a first embodiment of the THz-wave generation apparatus according to the present invention.

FIG. 4 is a diagram showing a first embodiment of a THz-wave generation apparatus according to the present invention. As shown in the drawing, a THz-wave generation apparatus 10 of the present invention includes: a nonlinear optical crystal 1 (preferably, a $LiNbO_3$ crystal) which can generate a THz wave by a parametric effect; a pump light incidence apparatus 12 for allowing a pump light 2 to be incident upon the nonlinear optical crystal; and a seed light injection apparatus 14 for injecting a seed light 5 having a variable frequency in a generation direction of an idler light generated by the pump light.

The pump light incidence apparatus 12 is a single-frequency laser whose wavelength is fixed, such as an Nd:YAG laser. The pump light 2 is set such that the light is reflected by a reflection mirror 11 and incident upon the crystal 1 at a constant angle. For the seed light injection apparatus 14, any light source may be used, as long as the frequency is lower than that of the pump light 2 by about 1 to 3 THz, a single frequency is oscillated, and the frequency is variable. For example, a wavelength variable semiconductor laser, wavelength variable optical fiber laser, optical parametric oscillator, and the like can be used.

The seed light injection apparatus 14 includes angle dispersion compensation means 16. This angle dispersion compensation means 16 is set such that an incidence angle $\theta_{IN}$ of the seed light 5 onto the nonlinear optical crystal 1 substantially equals to a desired phase matching condition regardless of a wavelength.

The angle dispersion compensation means 16 is constituted of a wavelength dispersion element 17 for dispersing an optical path of the seed light by a difference of the wavelength of the seed light 5, and a dispersion enlargement/reduction element 18 which enlarges or reduces the dispersed optical path. In this example, the wavelength dispersion element 17 is a diffraction grating, and the dispersion enlargement/reduction element 18 is a confocal optical system (20) which collects a laser beam passed through a first focal point $f_1$ onto a second focal point $f_2$ positioned in an incidence plane of the nonlinear optical crystal.

Moreover, a method of the present invention comprises: using the above-described apparatus to inject the seed light 5 having the variable frequency in a generation direction of the idler light; and combining the wavelength dispersion element 17 for dispersing the optical path of the seed light by the difference of the wavelength of the seed light with the dispersion enlargement/reduction element 18 which enlarges or reduces the dispersed optical path to constitute the angle dispersion compensation means 16 so that the incidence angle $\theta_{IN}$ of the seed light upon the nonlinear optical crystal 1 substantially equals to the desired phase matching condition regardless of the wavelength.

According to the apparatus and method of the above-described present invention, the angle dispersion compensation means 16 which compensates for wavelength dispersion of the nonlinear optical crystal 1 in an incidence path of the seed light 5 of is-TPG is used so that the incidence angle of the injected seed light equals to the phase matching condition regardless of the wavelength. Therefore, it is unnecessary to adjust an optical axis for every time the wavelength of the seed light is changed, and a THz-wave frequency can remarkably easily be tuned at a high speed.

Moreover, the wavelength dispersion element 17 and dispersion enlargement/reduction element 18 can satisfy Equation (1) described later, the frequency can substantially automatically be tuned, and thereby it is unnecessary to adjust the optical axis every time the seed light wavelength is changed.

It is to be noted that a wavelength conversion method of using the dispersion element to compensate for angle dispersion of the nonlinear optical crystal so that the phase matching is constantly satisfied regardless of the wavelength is referred to as achromatic phase matching. The method is applied to second harmonic generation or broad-band second harmonic generation of an ultrashort laser pulse, which requires simultaneous phase matching of a broad-band wavelength. Such achromatic phase matching is described in the following documents.

[1] "Automatic phase-matched frequency-doubling system for the 240–350-nm region", Appl. Opt., 18, 2, pp. 193–196 (1979).

[2] "Achromatic phase matching for second harmonic generation of femtosecond pulses", IEEE J. Quantum Electron., 25, 12, pp. 2464–2468 (1989).

[3] “Achromatic phase matching for turnable second-harmonic generation by use of at grism”, Opt. Lett., 22, 16, pp. 1223–1225 (1997).

In the present invention, an optical system similar to that for use in the above-described achromatic phase matching is applied to compensation for angle dispersion of the THz-wave parametric generator, and broad-band frequency tuning of the THz wave is made possible without any optical path adjustment.

The optical system (angle dispersion compensation means 16) which can compensate for the dispersion of is-TPG in the above-described present invention can be constituted by:

(1) a combination of a plurality of wavelength dispersion elements 17 (diffraction grating, prism, and the like) which disperse/converge the optical paths for each wavelength; and (2) the dispersion enlargement/reduction element 18 (combination of the lens/reflection mirrors) which enlarges/reduces the dispersion with the wavelength dispersion elements for dispersing the optical path.

FIG. 4 shows a constitution example in which the diffraction grating is used as the wavelength dispersion element 17 and convex lens systems 21$a$, 21$b$ are used as the element (dispersion enlargement/reduction element 18) for enlarging/reducing the dispersion. A light diffracted by the diffraction grating 17 passes through different paths for each of wavelengths $\lambda_1$ to $\lambda_3$, and is incident upon the crystal 1 at an angle which differs with each wavelength. A dependence of an outgoing angle of the diffraction grating 17 on the wavelength depends on a dispersion characteristic $\theta_d(\lambda)$ of the dispersion element for use. A magnitude of dispersion is represented by an angle change $d\theta_d(\lambda)/d\lambda$ per unit wavelength, and is determined by density of grooves and diffraction angle with the diffraction grating. Therefore, the wavelength dispersion characteristic of the diffraction grating which can be designed and obtained does not always equal to the wavelength dispersion characteristic $\theta_{IN}(\lambda)$ of the non-collinear phase matching angle of the $LiNbO_3$ crystal. However, when an inclination $d\theta_d(\lambda)/d\lambda$ of the dependence of the diffraction angle on the wavelength is multiplied by a certain coefficient $\alpha$, Equation (1) results, and it is possible to approximately allow the dispersion of the diffraction grating to equal to the dispersion $d\theta_{IN}(\lambda)/d\lambda$ of the $LiNbO_3$ crystal.

[Equation 1]

$$\alpha\frac{d\theta_d(\lambda)}{d\lambda}\approx\frac{d\theta_{IN}(\lambda)}{d\lambda} \tag{1}$$

In the example of FIG. 4, a magnification is given by a combination of focal length $f_1$, $f_2$ of two convex lenses. A amount of angle dispersion passed through two convex lenses is $(f_1/f_2)\times d\theta_d(\lambda)/d\lambda$. Even when any dispersion element is used, and when appropriate $f_1$, $f_2$ are selected, both dispersion characteristics can substantially equal to each other. Subsequently, when the seed light incidence angle is adjusted with an appropriate wavelength (e.g., $\lambda_1$), the incidence angles of all wavelengths are automatically satisfied. Therefore, even when the seed light wavelength is changed, optical path adjustment is not necessary at all.

Figure 5:
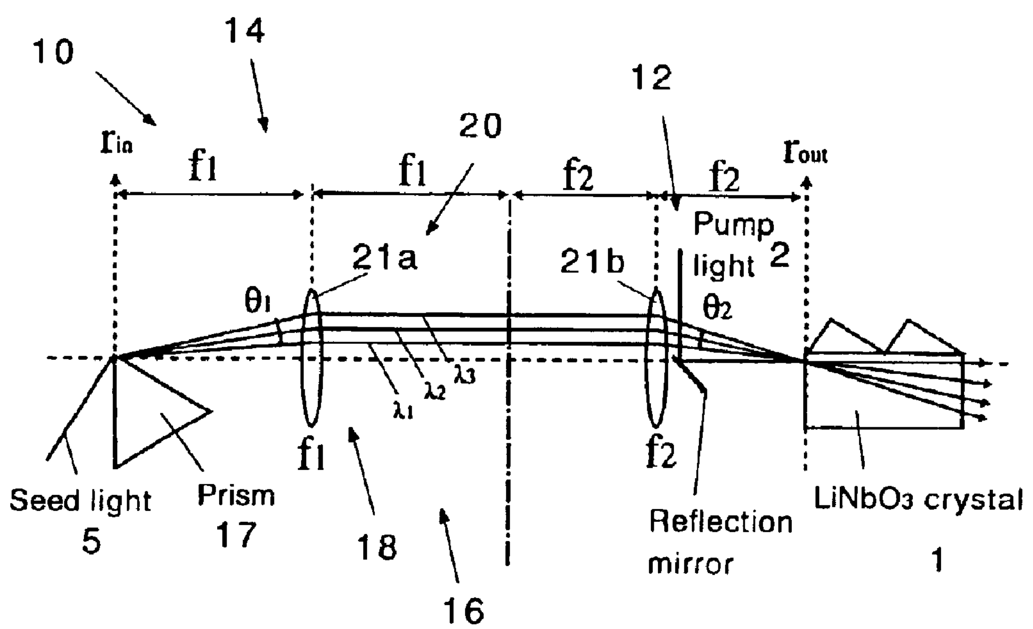
FIG. 5 is a diagram showing a second embodiment of the THz-wave generation apparatus according to the present invention.
Figure 6A:
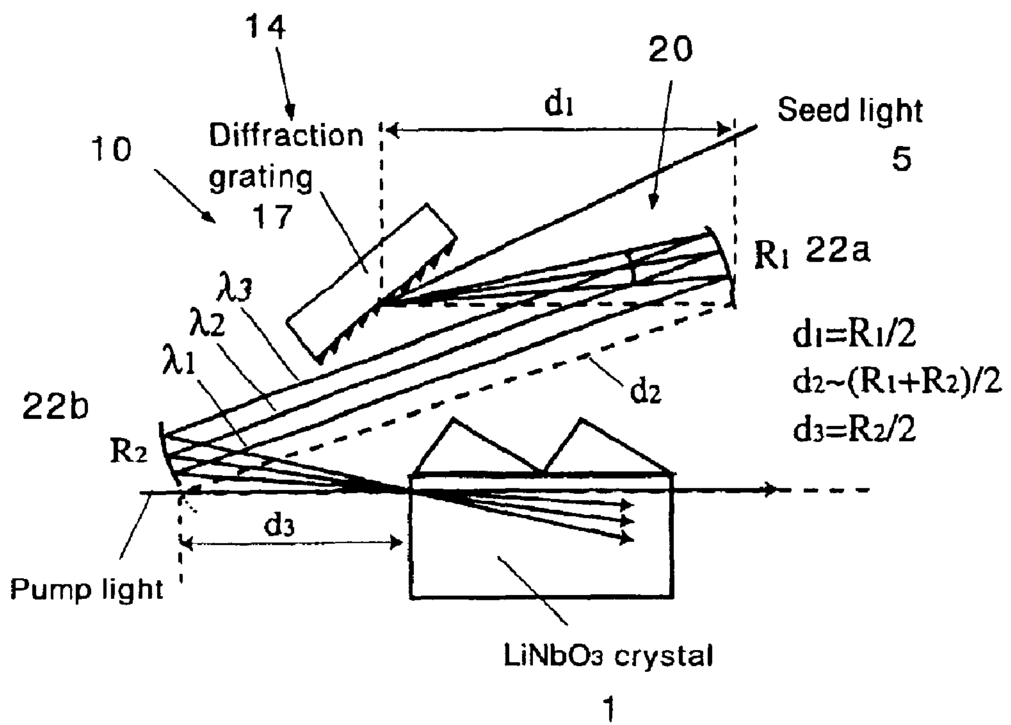
FIGS. 6A and 6B are diagrams showing a third embodiment of the THz-wave generation apparatus according to the present invention.

For the wavelength dispersion element 17, any optical element may be used as long as the light is emitted via the path different with each wavelength. Not only the diffraction grating but also the prism and the combination of the diffraction grating and prism may also be used. For the optical system (dispersion enlargement/reduction element 18) for enlarging/reducing the dispersion in the subsequent stage, for example, an optical system can be used in which two or more convex lens systems, two or more concave surface mirror or parabolic mirrors, a combination of the convex lens with the concave surface mirror/parabolic mirror, and the like are disposed so as to share mutual focal points. FIG. 5 shows a constitution example in which the prism and convex lens system are used, and FIG. 6A shows a constitution example in which the diffraction grating and two concave surface mirrors (first concave surface mirror 22$a$, second concave surface mirror 22$b$) are used.

Figure 6B:
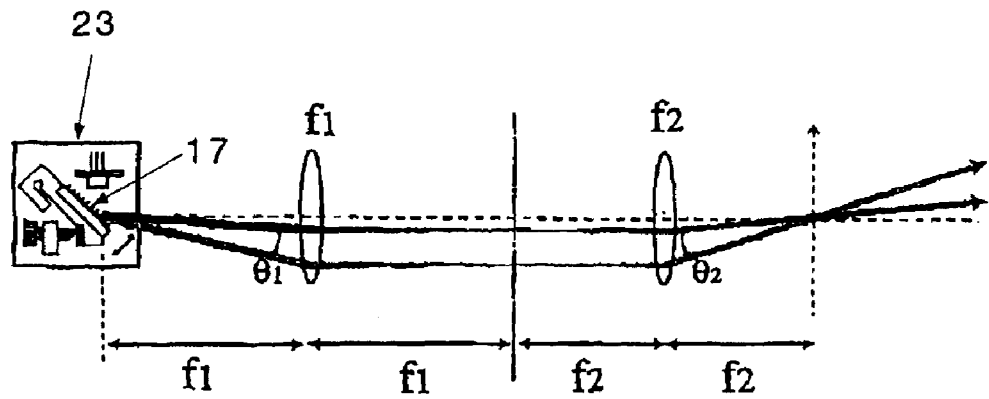

Moreover, as the wavelength dispersion element for use in the present invention, as shown in FIG. 6B, the wavelength dispersion element inside the wavelength variable laser can also be used. For example, a typical lit row type semiconductor laser 23 includes the diffraction grating 17 in addition to the semiconductor laser element, and the wavelength can be selected in accordance with the angle of the diffraction grating 17. When the first-order diffraction light is used as the feedback light to the semiconductor laser and reflected light is used as an external output, and when the angle of the diffraction grating is changed in order to change the wavelength, the outgoing angle additionally changes. The wavelength dispersion characteristic of the outgoing angle obtained here is adjusted by the dispersion enlargement/reduction element in the subsequent stage and the light is injected into the $LiNbO_3$ crystal.

CONCRETE EXAMPLE OF THE INVENTION

In a case in which the confocal optical system of the diffraction grating and convex lens system is used to inject the light as shown in FIG. 4, calculation and experiment result are shown. For an excitation light source, an Nd:YAG laser having a wavelength of 1.064 μm is used. For a seed light source, a wavelength variable semiconductor laser of a continuous wave for generating a wavelength of 1.067 to 1.075 μm is used. For the nonlinear optical crystal, the $LiNbO_3$ crystal is used.

(Dependence of is-TPG Phase Matching Angle on Wavelength)

Figure 1B:
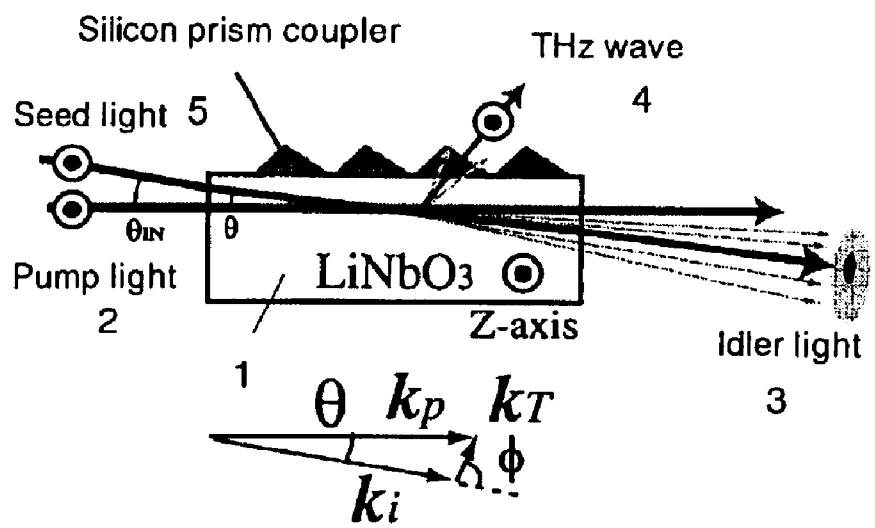
Figure 2:
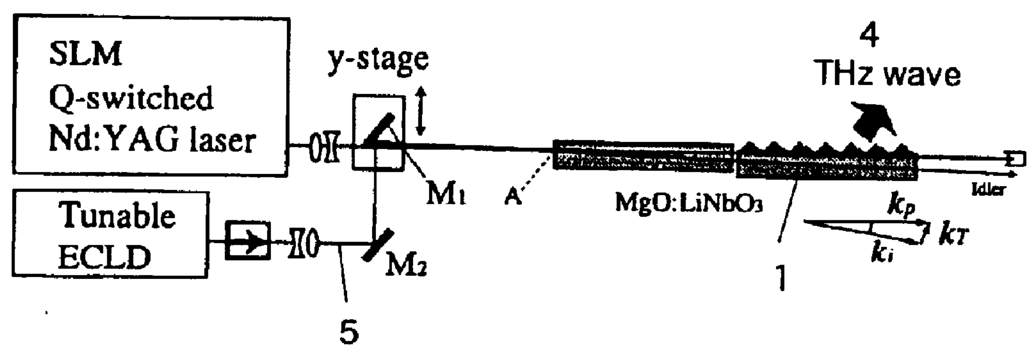
FIG. 2 is a configuration diagram of a prior-application THz-wave generation apparatus.
Figure 3:
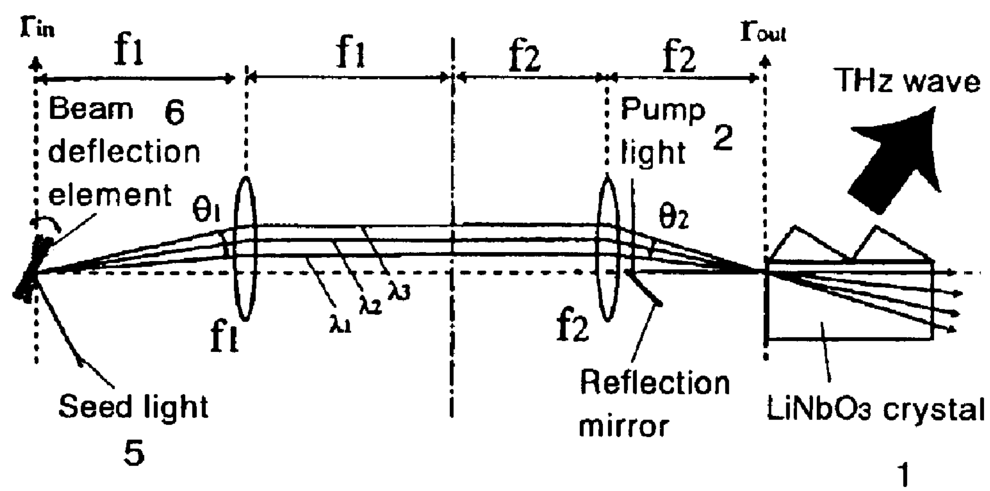
FIG. 3 is a configuration diagram of another prior-application THz-wave generation apparatus.

First, the dependence of the is-TPG phase matching angle on the wavelength is calculated for design of the angle dispersion compensation means. As shown in FIGS. 1A, 1B, assuming that the frequencies of the pump light, idler light, and THz wave are $\omega_p$, $\omega_i$, $\omega_T$, and wave number vectors are $k_p$, $k_i$, $k_t$, the frequency generated by is-TPG is obtained from an energy conservation law:

$$\omega_p=\omega_i+\omega_T \tag{2}$$

Moreover, an angle $\theta$ formed by the wave number vectors of the pump and idler lights in the $LiNbO_3$ crystal is obtained from the non-collinear phase matching condition:

$$k_p=k_i+k_T \tag{3}$$

$\omega_p$ is an excitation light frequency, and is constant. $\omega_i$ changes with the frequency of the seed light. The THz-wave frequency is determined from a relation of $\omega_T=\omega_p-\omega_i$.

Figure 7A:
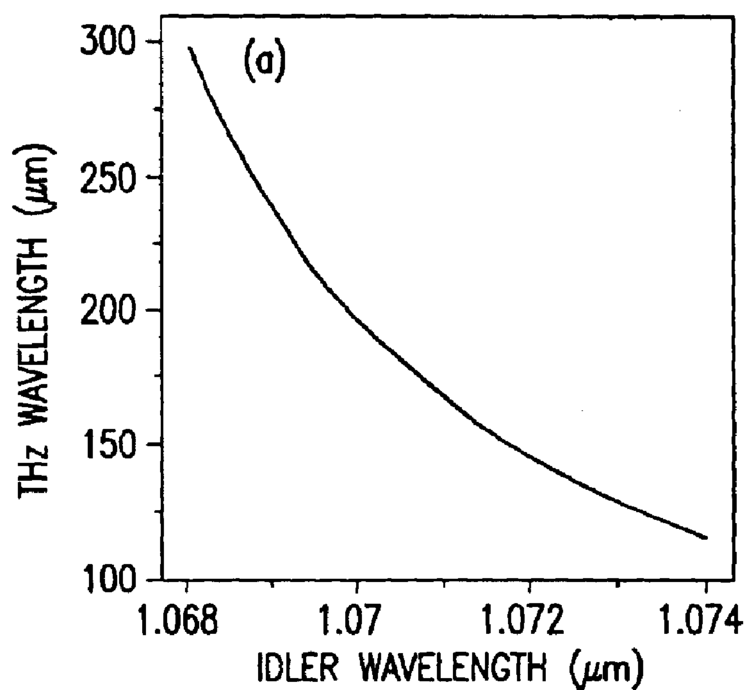
FIG. 7A is a diagram showing a relation between an idler wavelength and THz wavelength.

FIG. 7A shows a relation between idler and THz wavelengths, when the wavelength of the pump light is set to 1.064 μm. The THz wave and idler wavelength simultaneously change in accordance with $\omega_p=\omega_i+\omega_T$ so that the sum of the frequencies of the idler light and THz wave become constant.

A phase matching angle $\theta$ is represented by Equation (4) by cosines law, when the sizes of the wave number vectors are $k_p$, $k_i$, $k_T$.

[Equation 2]

$$\theta = \cos^{-1}\left\{\frac{k_p^2 + k_i^2 - k_T^2}{2k_p k_i}\right\} \quad (4)$$

Moreover, when a parallelepiped crystal is used as shown in FIG. 1, the angle $\theta_{IN}$ outside the $LiNbO_3$ crystal is obtained according to Snell's law as follows:

$$\theta_{IN} = \sin^{-1}(n_e \sin\theta) \quad (5),$$

wherein $n_e$ denotes a refractive index of the $LiNbO_3$ crystal with respect to the pump light, and the idler. Refractive indexes $n_T$, $n_p$, $n_i$ with respect to the THz wave, pump light, and idler light are used to represent a relation between the size of the wave number vector and frequency as follows.

$$k_T = n_T \omega_T / c \quad (6)$$

$$k_p = n_p \omega_p / c \quad (7)$$

$$k_i = n_i \omega_i / c \quad (8)$$

When the seed light frequency is determined all $\omega_p$, $\omega_i$, $\omega_T$ are given. Therefore, when the refractive indexes $n_T$, $n_p$, $n_i$ of the $LiNbO_3$ crystal with respect to the respective frequencies are given, the phase matching angle $\theta$ can be obtained by Equation (4).

The refractive index of the $LiNbO_3$ crystal has the dependence on the wavelength, and greatly differs especially in THz wave and light wave bands. The dependence of the refractive index $n_T$ of the THz wave band on the wavelength is given by an approximate equation of Equation (9) [D. R. Bosomworth: Appl. Phys. Lett., 9, p. 330 (1966).].

[Equation 3]

$$n_T(\omega_T) = \sqrt{\frac{\varepsilon_0 \omega_{TO}^2 - \varepsilon_\infty \omega_T^2}{\omega_{TO}^2 - \omega_T^2}} \quad (9)$$

$$n_e(\lambda) = \sqrt{4.5567 + 2.605 \times 10^{-7} T^2 + \frac{0.097 + 2.7 \times 10^{-8} T^2}{\lambda^2 - (0.201 + 5.4 \times 10^{-8} T^2)^2} - 0.0224\lambda^2} \quad (10)$$

$\omega$ is a frequency represented by a unit $cm^{-1}$. Moreover, values of constants are $\omega_{TO}$=220 $cm^{-1}$, $\epsilon_0$=25.5, $\epsilon$=4.64 at a temperature of 300 K.

On the other hand, the dependence of refractive indexes $n_p$, $n_i$ on the wavelength with respect to the pump and idler lights is given by Approximate Equation (10) of a light wave band refractive index $n_e$ with respect to a extraordinary ray [H. V. Hobden and J. Warner: Phys. Lett. (1966).].

$\lambda$ is a wavelength represented by unit $\mu$m, and T is a temperature [K].

Figure 7B:
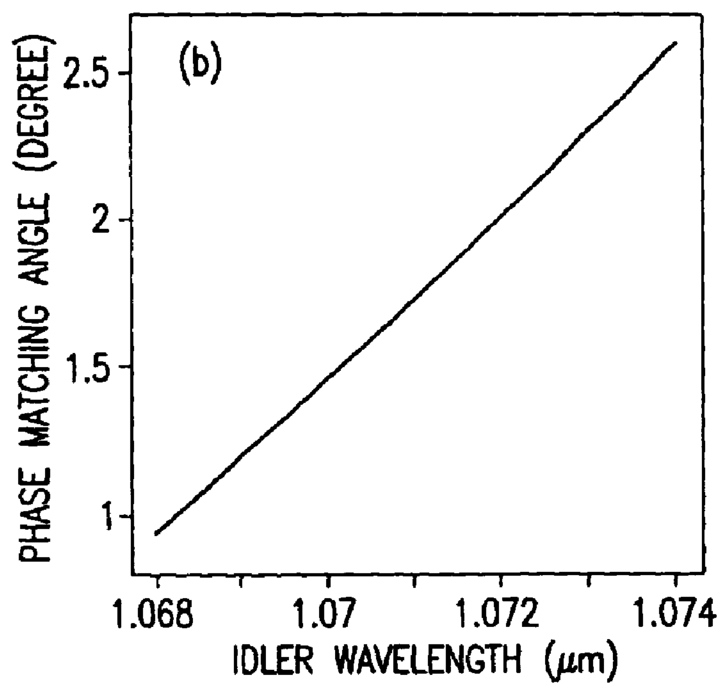
FIG. 7B is a diagram showing a relation of a phase matching angle to the idler wavelength.

FIG. 7B shows a result of calculation of the change of the phase matching angle with respect to the idler wavelength based on Approximate Equations (9) (10) of the refractive index, assuming that the wavelength of the pump light is 1.064 $\mu$m and temperature T=300 K. When the idler wavelength changes to 1.074 $\mu$m from 1.068 $\mu$m, the phase matching $\theta_{IN}$ changes to 2.6° from 0.9° by about 1.7° in terms of the width. For the optical axis of seed light incidence, the angle dispersion compensation means 16 needs to be constituted so as to satisfy a relation between the wavelength and angle of this graph.

(Angle Dispersion by Diffraction Grating)

Figure 8:
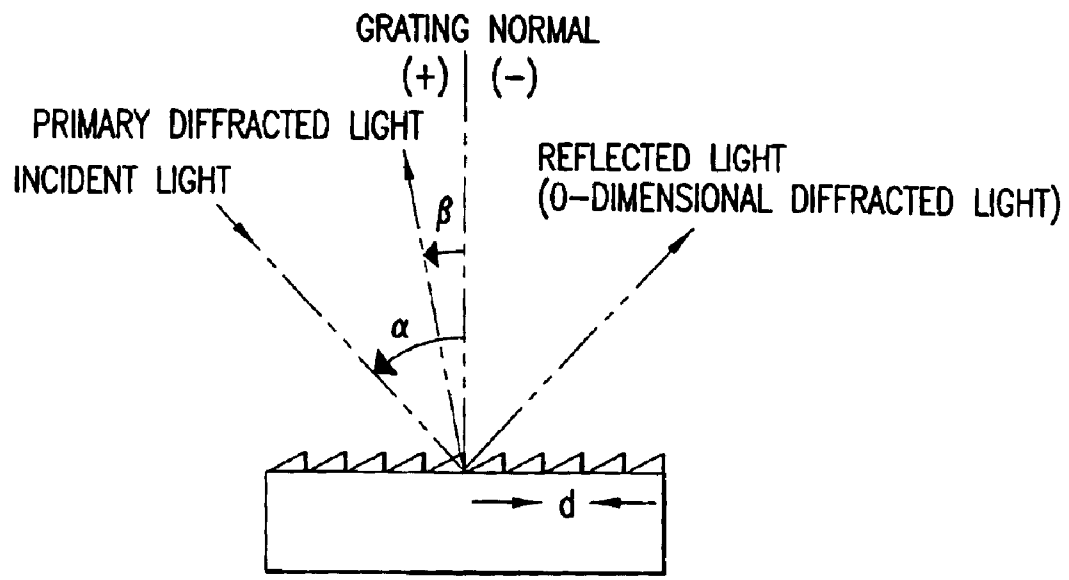
FIG. 8 is an explanatory view of a reflection type diffraction grating.

Assuming that a spacing between grooves of a reflection type diffraction grating shown in FIG. 8 is d, incidence wavelength is $\lambda$, incidence angle is $\alpha$, diffraction angle is $\beta$, and diffraction order is m, they are in the following relation:

$$d(\sin(\beta) + \sin(\alpha)) = m\lambda \quad (11).$$

When the incidence angle $\alpha$ is constant, the dependence of the first-order diffraction angle (m=1) on the wavelength is obtained as follows.

$$\beta(\lambda) = \sin^{-1}(\lambda/d - \sin(\alpha)) \quad (12)$$

Moreover, the size of the dispersion of the first-order diffraction angle is given by the following from Equation (11):

$$d\beta/d\lambda = 1/(d\cos\beta) \quad (13)$$

When the grating interval d is small and the outgoing angle $\beta$ is close the 90 degrees, the dispersion is enlarged. Additionally, when a high diffraction efficiency is to be obtained, the grating interval and diffraction angle $\beta$ of the usable diffraction grating are limited.

Figure 9:
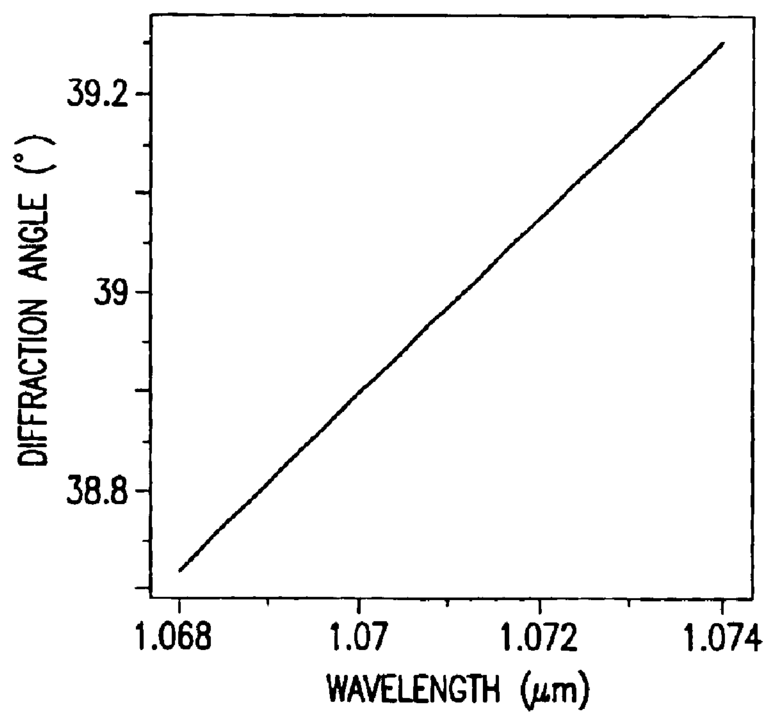
FIG. 9 shows a calculation example of a first-order diffraction angle of the diffraction grating.

FIG. 9 shows the result of the calculation of the first-order diffraction angle of the diffraction gratings in which the groove density is 1200/mm. The incidence angle was set to $\alpha$=41. When the incidence wavelength changes to 1.074 $\mu$m from 1.068 $\mu$m, the outgoing angle of a first-order diffracted light changes to 39.25° from 38.72° by 0.53° in terms of the width. This change amount is smaller than that (about 1.7°) of the phase matching angle of the $LiNbO_3$ crystal.

(Enlargement/Reduction of Angle Dispersion by Confocal Optical System)

Figure 10:
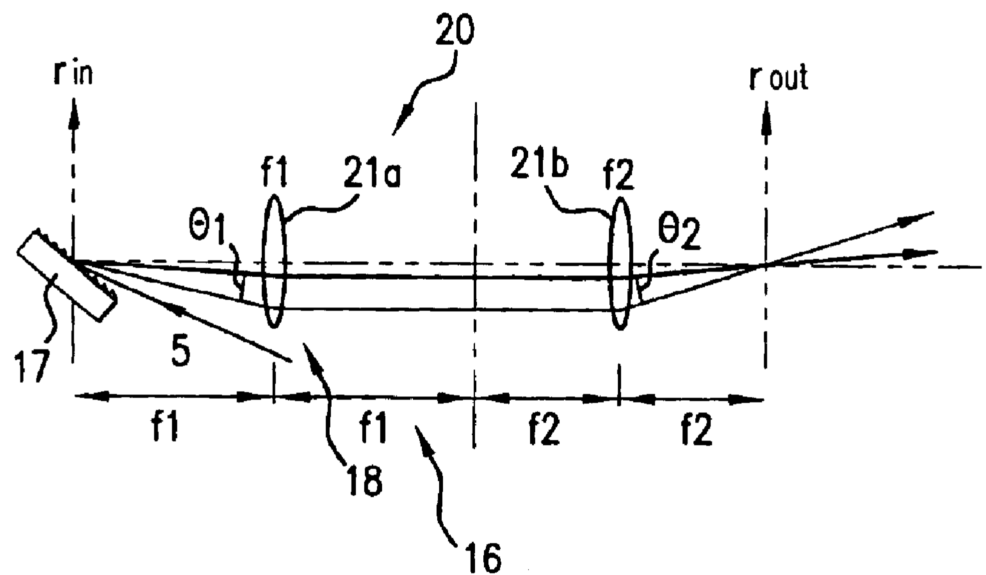
FIG. 10 is a schematic diagram of a confocal optical system.

As shown in FIG. 10, the focal length of a first lens is set to $f_1$, the focal length of a second lens is set to $f_2$, and the lenses are disposed at an interval of $f_1+f_2$ so as to share the focal point. A light ray matrix in which $r_{in}$ denotes an incidence point and $r_{out}$ denotes an outgoing point is calculated according to "Optical Electronics" (authored by A. Yariv), and a ray matrix is represented by Equation (14).

Assuming that $r_{in}$, $r_{in}'$ are the position and inclination of the light ray in the incidence plane and $r_{out}$, $r_{out}'$ are the position and inclination in the outgoing point, Equation (15) is obtained.

When a reflection point of the seed light is set to $r_{in}$=0 and an angle change is given to the beam, $r_{out}=r_{in}=0$, $r_{out}'=-(f_1/f_2)r_{in}'$ are obtained. This indicates that the incidence angle $r_{out}'$ of the $r_{out}$ plane changes centering on one point which is $r_{out}$=0 by $f_1/f_2$ times of the outgoing angle of the $r_{in}$ plane. Moreover, $r_{out}=-(f_2/f_1)r_{in}$ means that the image of the rout plane is enlarged/reduced $-f_2/f_1$ times, and this includes the enlargement/reduction of the size of the beam.

[Equation 4]

$$\begin{bmatrix} -\frac{f_2}{f_1} & 0 \\ 0 & -\frac{f_1}{f_2} \end{bmatrix} \quad (14)$$

$$\begin{bmatrix} r_{out} \\ r'_{out} \end{bmatrix} = \begin{bmatrix} -\frac{f_2}{f_1} & 0 \\ 0 & -\frac{f_1}{f_2} \end{bmatrix} \begin{bmatrix} r_{in} \\ r'_{in} \end{bmatrix} = \begin{bmatrix} -\frac{f_2}{f_1} r_{in} \\ -\frac{f_1}{f_2} r'_{in} \end{bmatrix} \quad (15)$$

(Design of the Seed Light Incidence Optical System)

Figure 11:
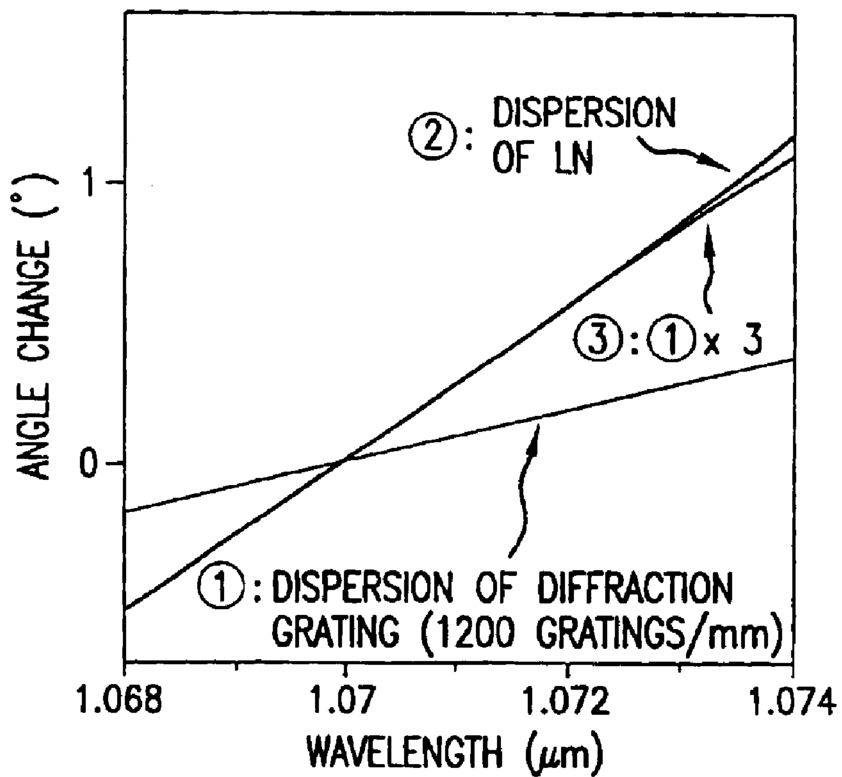
FIG. 11 shows a calculation example of angle dispersion of a phase matching angle $\theta_{IN}$ of a $LiNbO_3$ crystal and first-order diffraction light of the diffraction grating.

FIG. 11 shows the result of the calculation of the angle dispersion of the phase matching angle $\theta_{IN}$ of the $LiNbO_3$ crystal and first-order diffraction light of the diffraction gratings in which the groove density is 1200 gratings/mm. The abscissa indicates the idler wavelength, and the ordinate indicates the angle change centering on a wavelength of 1.07 $\mu$m. The diffraction angle was calculated assuming the incidence angle of $\alpha$=41° of FIG. 8.

Comparison of curve ① with ② shows that the size of the angle dispersion of the first-order diffracted light including 1200 grooves/mm is about ⅓ of that of the $LiNbO_3$ crystal. Curve ③ indicates a result obtained when the size of the angle dispersion of 1200 grooves/mm is enlarged three times. Two curves have a deviation of 0.16° or less in a range of idler wavelength of 1.068 $\mu$m to 1.074 $\mu$m.

From the experiments of is-TPG heretofore reported, it is seen that an angle allowable value is 0.16° or less. Therefore, all range of the idler wavelength of 1.068 $\mu$m to 1.074 $\mu$m enters an allowable range of injection-seeding.

Figure 12:
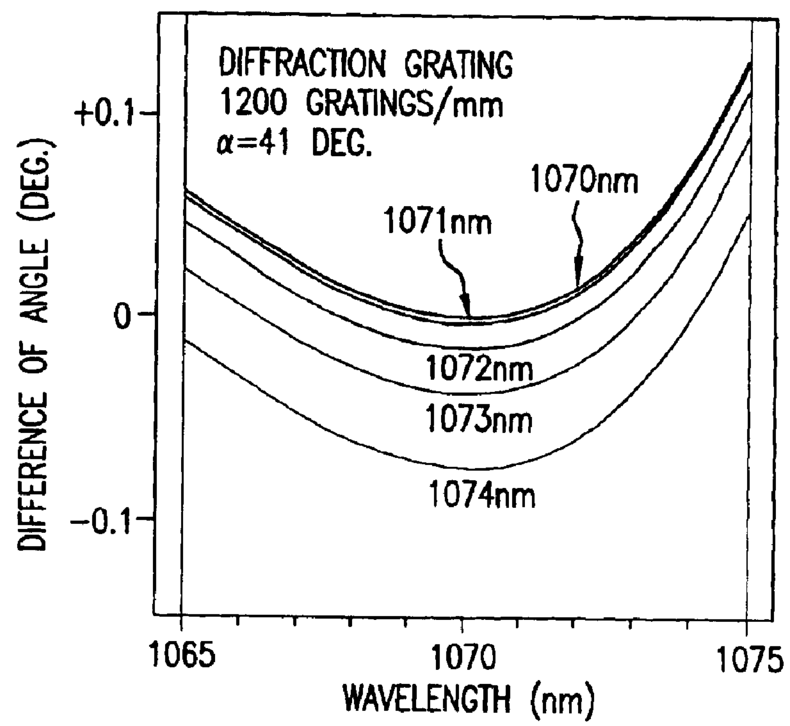
FIG. 12 shows a calculation example of deviation of the phase matching angle of the $LiNbO_3$ crystal and seed light incidence angle.

FIG. 12 shows the result of the calculation of deviation of the phase matching angle of the $LiNbO_3$ crystal and seed light incidence angle with the use of 1200 grooves/mm. The incidence angle $\alpha$ was assumed to be 41 deg. Each curve shows the wavelength for adjusting the seed light incidence angle. The angle allowable value is ±0.16 deg. Therefore, this indicates that the injection-seeding is possible in the whole range even by the optical path adjustment between any wavelength of 1070 to 1074 nm.

Figure 13:
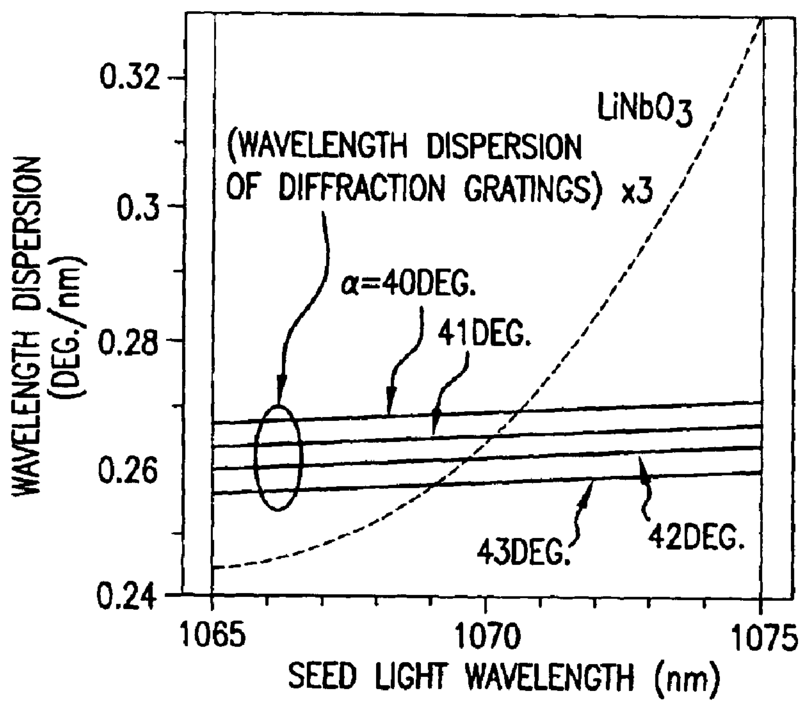
FIG. 13 shows a calculation example of dependence $d\theta_{IN}(\lambda)/d\lambda$ of a phase matching angle $\theta_{IN}(\lambda)$ on the wavelength and dependence (magnification 3) $3\times d\theta(\lambda)/d\lambda$ of a diffraction angle $\theta_d(\lambda)$ on the wavelength.

FIG. 13 shows the result of the calculation of dependence $d\theta_{IN}(\lambda)/d\lambda$ of the phase matching angle $\theta_{IN}(\lambda)$ on the wavelength and dependence (magnification 3) $3\times d\theta(\lambda)/d\lambda$ of the diffraction angle $\theta_d(\lambda)$ on the wavelength. The incidence angle $\alpha$ was calculated every degree to 43 from 40 degrees. When the incidence angle upon the diffraction gratings is adjusted, the wavelength for allowing the dispersion of the phase matching angle of the $LiNbO_3$ crystal to equal to that of the diffraction gratings (wavelength at which the curve of FIG. 12 is minimum) can be changed.

EXAMPLES

Examples of the present invention will be described hereinafter.

(Experiment Apparatus)

Figure 14:
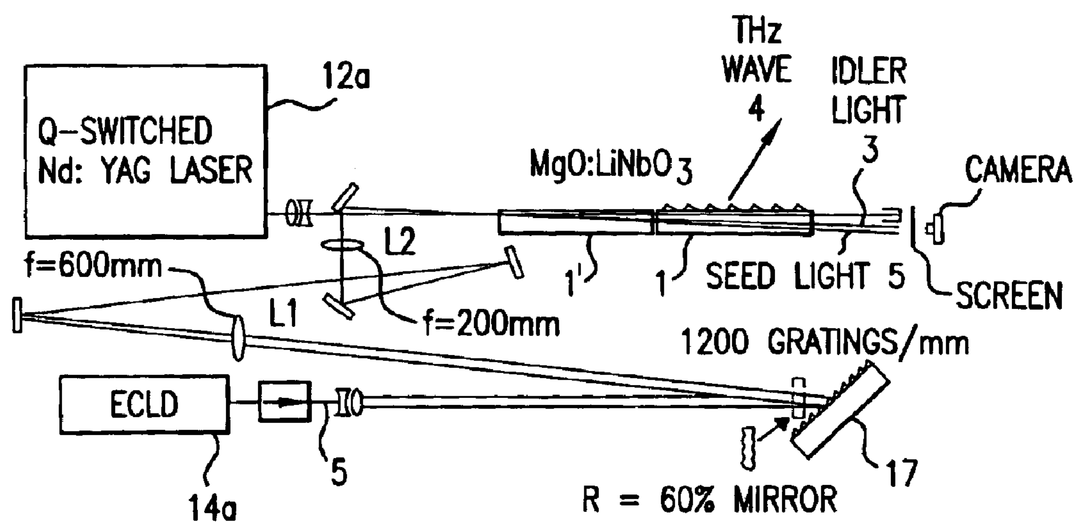
FIG. 14 is a configuration diagram of the THz-wave generation apparatus of the present invention for use in experiments.

FIG. 14 is a configuration diagram of the THz-wave generation apparatus of the present invention for use in experiments. The nonlinear optical crystals used for generating the THz wave is the $LiNbO_3$ crystal or $MgO:LiNbO_3$ crystal 1', $MgO:LiNbO_3$ crystal 1. To lower a threshold of THz generation, two $LiNbO_3$ crystals were connected in series and used. As the crystal of the previous stage, the $LiNbO_3$ crystal (non-doped) having a length of 50 mm or 5 mol % $MgO:LiNbO_3$ crystal having a length of 73 mm was used. As the crystal of the subsequent stage, the 5 mol % $MgO:LiNbO_3$ crystal having a length of 73 mm and width of 8 mm was used.

A pump light source 12*a* is a Q switch Nd:YAG laser. A seed light source 14*a* is an external cavity semiconductor laser. For the seed light 5, a beam diameter is expanded to about 3 mm full width half maximum by a beam expander and reflected/diffracted by 1200 diffraction gratings/mm. The first-order diffracted light is injected into the $LiNbO_3$ crystal 1. A diffraction efficiency of the diffraction grating 17 into the first-order diffracted light is about 48%, and 23 mW of an output of 48 mW of the seed light source 14*a* was used in the injection. A lens (L1) having a focal length of 600 mm was disposed in a position of 600 mm from the reflection point of the diffraction grating, and a lens (L2) having a focal length of 200 mm was disposed in a position of 800 mm from L1. L1 and L2 share the focal point, and constitute a telescope of 3:1. The angle dispersion of the first-order diffracted light by the diffraction gratings is expanded three times. The beam diameter is reduced to ⅓.

(Seed Light Incidence Angle Change)

Figure 15:
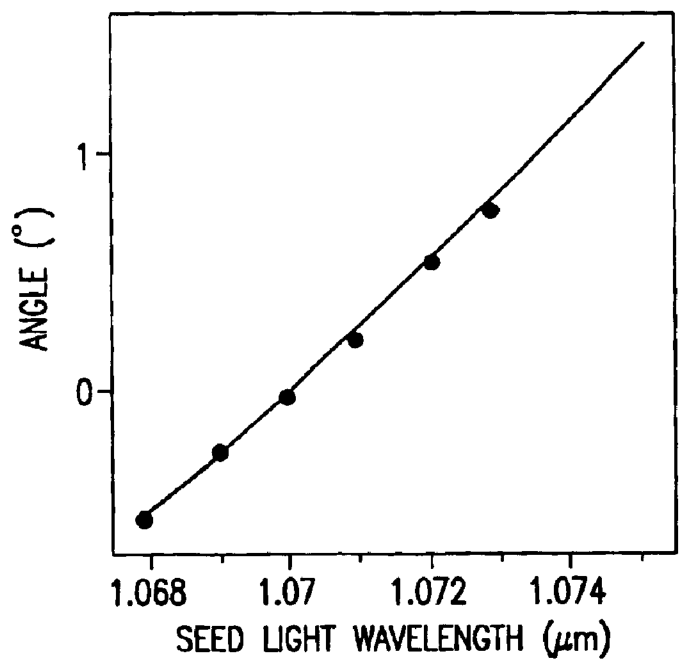
FIG. 15 shows an observation result of an incidence angle change in changing a seed light wavelength.

FIG. 15 shows a result of observation of the incidence angle change in changing the seed light wavelength. The optical axis was adjusted so that a maximum injection-seeding effect is obtained at a wavelength of 1.07 $\mu$m. Thereafter, the seed light wavelength was changed, and it was judged whether the incidence angle of the seed light changed as calculated. The position of the seed light was observed about every 1 nm from 1.068 $\mu$m to 1.073 $\mu$m, and it was confirmed that the deviation of the incidence angle was 0.1° or less even with a seed light wavelength of 1.073 $\mu$m.

(Idler Light Beam Profile)

Figure 16:
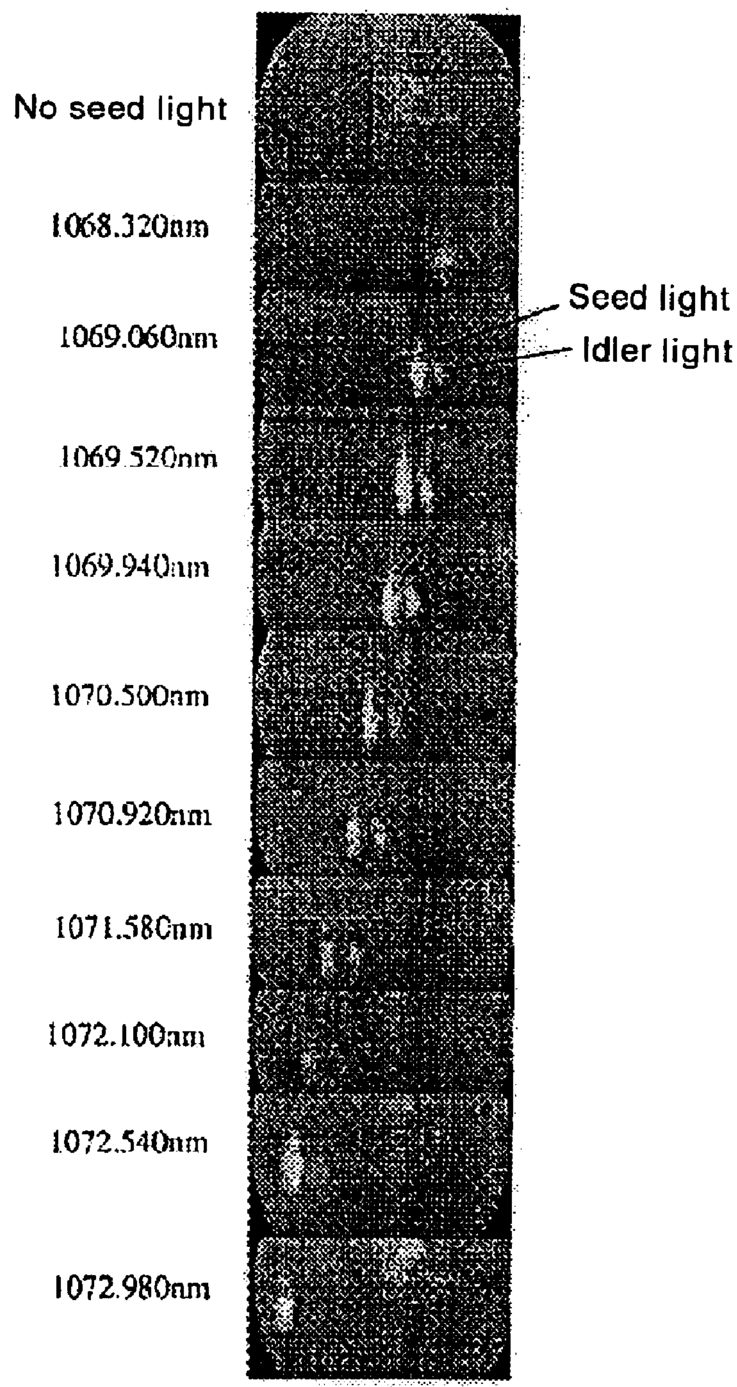
FIG. 16 is a diagram showing the dependence of seed and idler lights on the wavelength.

FIG. 16 is a diagram showing the dependence of the seed and idler lights on the wavelength, which was observed in a position of about 80 cm from the incidence plane upon the crystal 1. In the diagram, the generation direction of the THz wave is shown on the right side. An uppermost photograph shows the beam profile of the idler light 3 in which the seed light 5 is not injected. It means that the light has a broad angle distribution and spectrum line width is broad. When the wavelength and angle of the seed light are adapted to the phase matching condition and the seed light is injected into the $LiNbO_3$ crystal 1, as shown photographs of the seed light wavelengths of 1070.500 nm to 1072.100 nm, the idler light wavelength is taken into the seed light wavelength, and a space profile converges in one point. Additionally, the optical axis of the seed light beam is adjusted so that the outputs of the THz wave and idler light are maximized. Then, the idler light beam is generated in a position spatially extending in parallel with the seed light and deviating by several millimeters. The seed light 5 is parallel to the idler light 3, and it is therefore seen that the phase matching angles equal to each other. It is to be noted that the reflection mirror is not adjusted at all during the change of the seed light wavelength. Therefore, it has been confirmed that the seed light incidence angle automatically changes by the effect of the diffraction grating 17 and that the spectrum line width is narrowed in a broad wavelength range.

(THz-Wave Output)

Figure 17:
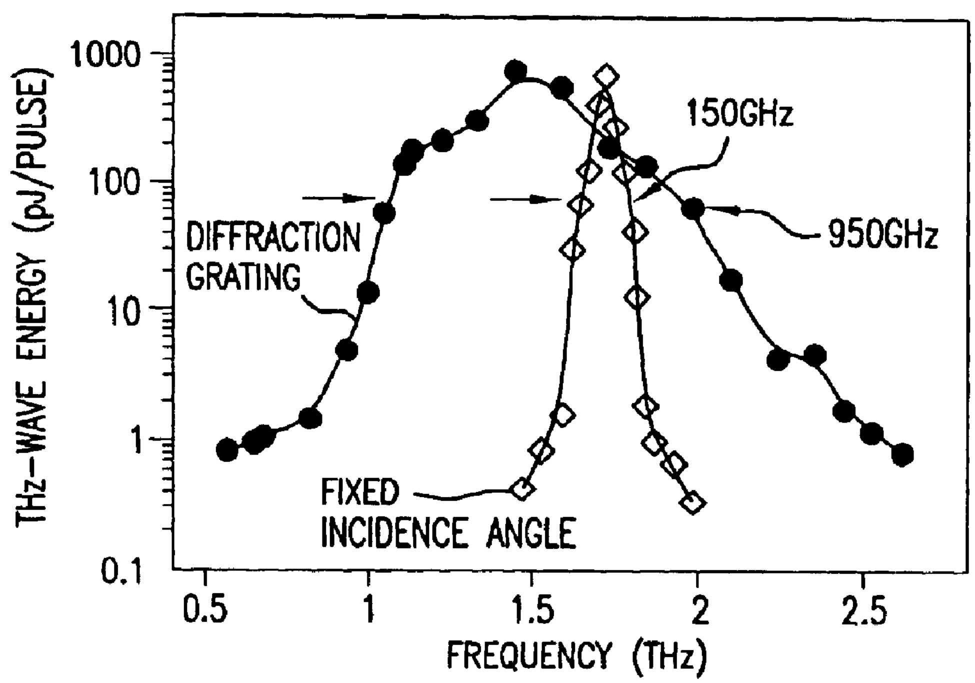
FIG. 17 shows a comparison result of dependence of a THz-wave output on a frequency.

FIG. 17 shows the result of measurement and comparison of the dependence of the THz-wave output on the frequency in divided cases in which the diffraction gratings were used to inject the light and the reflection mirror having the fixed incidence angle was used to inject the light. The abscissa indicates the THz-wave frequency, and the ordinate indicates a THz-wave output energy. White squares and black circles show the output wavelength dependence in cases in which the reflection mirror having a reflection ratio of about 60% was used to inject the light at the fixed incidence angle and 1200 grooves/mm were used to inject the light.

Since the mirror having the reflection ratio of about 60% was used, an injected light power was 30 mW. When the diffraction grating is replaced with a normal reflection mirror, and even when the wavelength changes, the seed light incidence angle does not change. Therefore, the efficiency of the injection-seeding rapidly drops. The THz-wave output was adjusted to be maximum at a frequency of 1.7 THz. The output energy in 1.7 THz was 0.7 nJ/pulse. However, even when the seed light frequency was changed by 100 GHz, the output dropped to 1/10 or less. A tunable range was defined in a frequency band in which the output drops to 1/10 of the peak value. Then, the value was 150 GHz in the full width at half maximum. In the experiment result already reported, when the seed light wavelength is set to be constant and the incidence angle is changed, the allowable width of the incidence angle is observed to be ±0.16°. The frequency band estimated from the allowable width is up to 300 GHz, and is close to the frequency band obtained this time. From this, it is seen that the frequency band with the fixed incidence angle is limited by the deviation of the seed light incidence angle.

On the other hand, when the seed light was injected by the diffraction gratings, the incidence angle was adjusted and fixed in an optimum state so as to maximize the THz-wave output at a seed light wavelength of 1071 nm. When the dependence on the wavelength was measured, the optical axis was not adjusted at all. It has been confirmed from FIG. 17 that the injection-seeding is continuously performed in a range of frequencies of 0.6 to 2.6 THz. The maximum output was obtained in the vicinity of a frequency of 1.45 THz, and was about 0.8 nJ/pulse. The frequency band in which the output dropped to 1/10 of the peak value was about 950 GHz as compared with the frequency band with the fixed incidence angle, and a tunable bandwidth was expanded to six times or more.

Additionally, with the injection-seeding by the diffraction gratings, the frequency band is limited by the gain of the $LiNbO_3$ crystal, excitation intensity, and frequency characteristic of amplification gain dependent on absorption loss, and the bandwidth is not limited by the deviation of the seed light incidence angle. In comparison of the frequency band in which the injection effect is maintained, the band of the injection method by the diffraction gratings is 20 times or more as broad as that of the fixed incidence angle.

To confirm that the bandwidth was not limited by the deviation of the incidence angle, the seed light incidence angle was re-adjusted at a wavelength apart from a wavelength of 1072 nm and subjected to the optical axis adjustment, but it was impossible to observe an output increase of the THz wave. Therefore, it has been confirmed that a slight remaining deviation of the phase matching angle from the incidence angle with the use of the diffraction gratings and lens optical system does not raise any problem in the injection-seeding efficiency of is-TPG.

Figure 18:
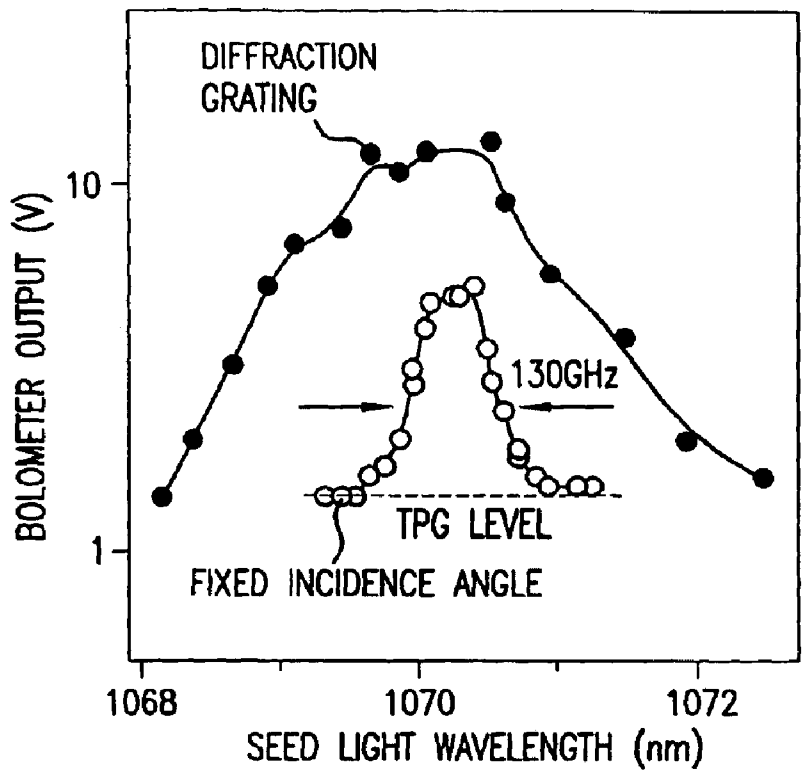
FIG. 18 shows a comparison result of dependence of the THz-wave output on the wavelength.

FIG. 18 shows another result of measurement and comparison of the dependence of the THz-wave output on the wavelength in the cases in which the diffraction gratings were used to inject the light and the reflection mirror having the fixed incidence angle was used to inject the light. The abscissa indicates the seed light wavelength, and the ordinate indicates the peak voltage of an Si bolometer for detecting the THz wave. Black circles show the dependence on the output wavelength in the injection with the diffraction gratings, and white circles show the dependence in a case in which the seed light wavelength changed at the fixed incidence angle.

To inject the seed light with the diffraction gratings, the incidence angle was adjusted and fixed in the optimum state so as to maximize the THz-wave output at a wavelength of 1071 nm, and the dependence on the wavelength was measured. It has been confirmed from the drawing that the injection-seeding is continuously performed in a range of 300 μm to 137 μm (frequencies of 1 to 2.2 THz). The obtained THz-wave output is a typical characteristic which depends on the gain of the crystal, excitation intensity, and absorption loss, and an influence of deviation of the seed light incidence angle is not seen. Even when the seed light incidence angle was re-adjusted at the wavelength subjected to the optical axis adjustment and apart from a wavelength of 1071 nm, it was impossible to obtain the output increase of the THz wave. Therefore, it has been confirmed that the level of the drop of the injection-seeding efficiency by the slight deviation from an ideal incidence angle does not raise any problem.

On the other hand, the white circles indicate the result of measurement of the THz output change in a case in which the seed light wavelength was changed at the fixed incidence angle. The incidence optical axis of the seed light was set so that the incidence angle was not changed even with the replacement of the diffraction gratings with the reflection mirror having a reflection ratio of about 60% and even with the changed wavelength. The THz-wave output was adjusted to be maximum at the seed light wavelength of 1070.3 nm, subsequently the seed light wavelength was changed, and the dependence on the wavelength was measured. Although the wavelength band has little change of the THz-wave output, the THz-wave output is found to rapidly drop with the change of the seed light wavelength. The frequency band in which the output drops to the half is 130 GHz, and is close to the frequency band (up to 300 GHz) estimated from the allowable width ±0.16° of the seed light incidence angle. Therefore, the deviation of the seed light incidence angle is apparently a cause for the output drop.

Therefore, as apparent from the comparison of the output characteristics, it has been confirmed that the angle dispersion compensation means using the diffraction gratings and convex lens system can expand a continuous tuning range.

(Wavelength Measurement)

Figure 19:
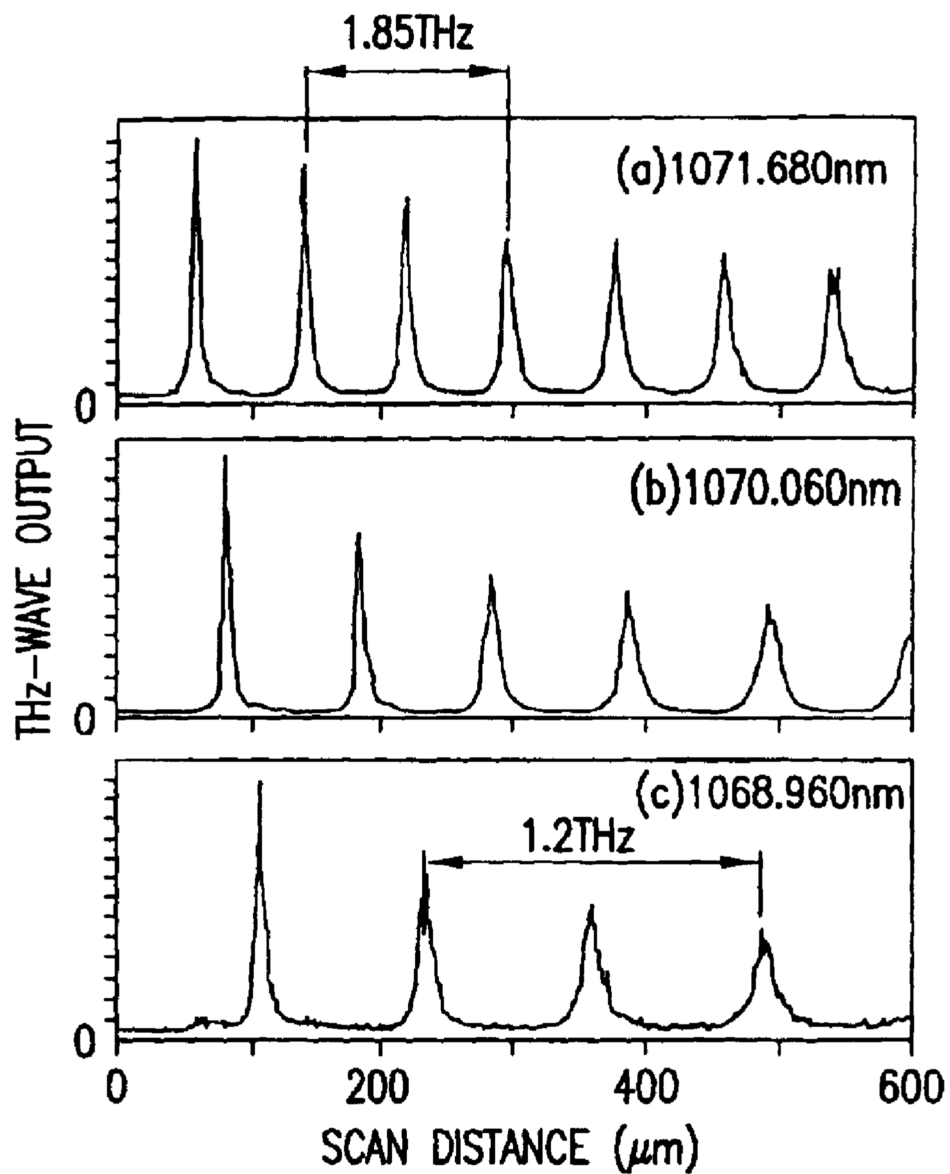
FIG. 19 shows a measured THz wavelength using a scanning Fabry-Perot interferometer.

FIG. 19 shows a THz wavelength measured using a scanning Fabry-Perot interferometer. The seed light wavelengths are (a) 1071.680 nm, (b) 1070.060 nm, and (c) 1068.960 nm. The incidence angle is not adjusted at all in measuring (a) to (c). A mirror interval of the scanning Fabry-Perot interferometer was expanded from a close state of 100 μm or less by a 1 μm step. When the injection-seeding is not performed, the THz-wave parametric generator generates a white light having a frequency band of about 500 GHz. Since FSR of the scanning Fabry-Perot interferometer soon turns to 500 GHz or less, the spectrum line width is exceeded, and an interference pattern cannot be seen quickly.

When the seed light is injected at the adjusted angle, a generated spectrum is taken into the injection wavelength, and therefore a monochromatic THz wave is generated. It is considered that the spectrum line width of the idler light reaches a Fourier transform limit by the seed light injection. The spectrum line width of the THz wave equals to the spectrum line width of the pump light by the energy conservation law. In some of the Nd:YAG lasers used in the present experiment, the injection-seeding is not performed, and the typical spectrum line width is 50 GHz. The spectrum line width of the THz wave measured with the scanning Fabry-Perot interferometer is about 50 GHz. Therefore, it is seen that the injection-seeding is applied at any wavelength. Moreover, the frequency of FIG. 19(*a*) is about 1.85 THz, and the frequency of (c) is 1.2 THz. A difference of the frequency is 600 GHz or more, and the continuous frequency tuning is impossible without the optical axis adjustment of the seed light in the related-art injection-seeding method.

(Application Example to Absorption Spectrum Measurement)

Figure 20A:
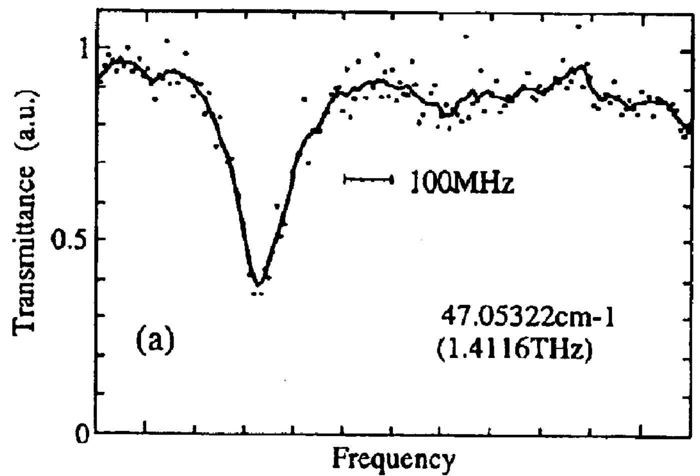
FIGS. 20A, 20B, 20C show absorption spectrum measurement results of water vapor obtained using a THz-wave parametric generator of a diffraction grating injection type.
Figure 20B:
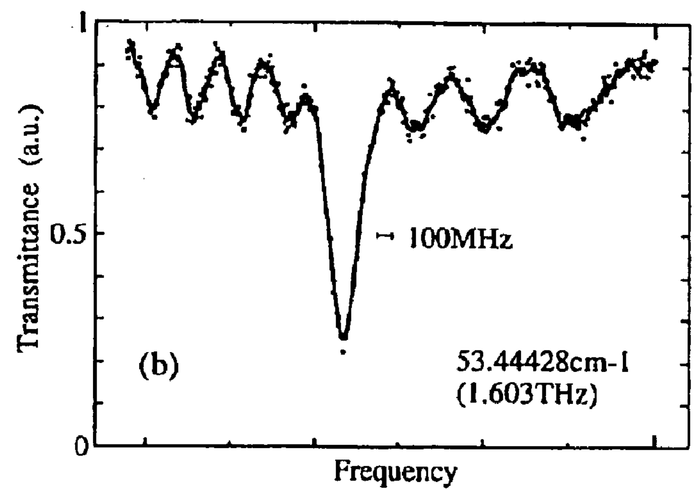
Figure 20C:
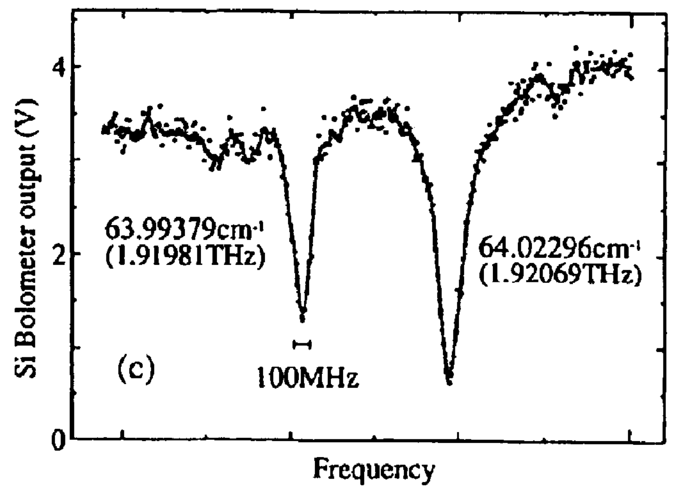

FIGS. 20A to 20C show absorption spectrum measurement results of water vapor obtained using the THz-wave parametric generator of the diffraction grating injection type. FIGS. 20A to 20C show results of measurement of absorption spectrum of the water vapor existing in the vicinities of THz-wave frequencies of (A) 1.41 THz, (B) 1.60 THz, and (C) 1.92 THz. The water vapor which is a measurement sample is obtained by sealing the atmosphere at temperature of 22° C. and humidity of 43% into a pipe having a length of 50 cm at a pressure of 10 Pa or less.

FIGS. 20A, 20B show the results obtained by using two DTGS detection units for normal-temperature operation to perform two-channel measurement of reference and signal lights. The ordinate indicates that a signal light output is standardized by a reference light output and represented by transmittance. FIG. 20C indicates the result of one-channel measurement of only the signal light using the Si bolometer. The ordinate is represented by the output voltage of the detection unit. In the vicinity of 1.92 THz, two absorption lines exist adjacent to each other, and can be used in calibrating the frequency. The pressure of the water vapor is sufficiently reduced, and it is therefore considered that the observed spectrum width represents the spectrum width of the light source. It is seen that the width of the absorption spectrum is about 100 MHz and that the spectrum width of is-TPG is about 100 MHz.

Moreover, during the measurement of FIGS. 20A to 20C, it was unnecessary to re-adjust the seed light axis. For example, (A) was apart from (C) by 500 GHz or more, and the optical axis adjustment was essential in the related-art injection method. In the injection-seeding method using the diffraction gratings, it is sufficient to perform only the frequency adjustment of the seed light, and the absorption spectrum in a continuously broad frequency range can be observed.

As described above, in the present invention, there has been proposed injection-seeding means in which enlargement/compression functions of the incidence angle by the wavelength dispersion element and confocal optical system are combined to constantly keep an optimum relation between the seed light wavelength injected into the non-collinear parametric generator and the incidence angle.

It is indicated by the calculation that the non-collinear phase matching condition of the $LiNbO_3$ crystal can approximately be satisfied by 1200 grooves/mm grating and 3:1 telescope. The continuous frequency tuning has experimentally been confirmed. By the use of the present invention, a remarkably simple injection-seeded type THz-wave parametric generator can be constituted without requiring any mechanical control.

Therefore, according to the THz-wave generation apparatus and tuning method of the present invention, the frequency tuning of the injection-seeded type THz-wave parametric generator (is-TPG) using the non-collinear phase matching can substantially automatically be performed. Thereby, it is unnecessary to adjust the optical axis every time the seed light wavelength is changed, and superior effects are produced that the THz-wave frequency tuning can remarkably easily be performed at the high speed.

It is to be noted that the present invention is not limited to the above-described embodiment and can of course be variously changed in a range without departing from the scope of the present invention.

What is claimed is:

1. A THz-wave generation apparatus comprising: a nonlinear optical crystal (1) which can generate a THz wave by a parametric effect; a pump light incidence apparatus (12) for allowing a pump light (2) to be incident upon the nonlinear optical crystal; and a seed light injection apparatus (14) for injecting a seed light (5) having a variable frequency in a generation direction of an idler light (3) generated by the pump light, wherein the seed light injection apparatus (14) comprises angle dispersion compensation means (16) in which an incidence angle $\theta_{IN}$ of the seed light upon the nonlinear optical crystal (1) is set so as to substantially equal to a desired phase matching condition regardless of a wavelength.

2. The THz-wave generation apparatus according to claim 1, wherein the angle dispersion compensation means (16) comprises: a wavelength dispersion element (17) for dispersing an optical path of the seed light by a difference of a wavelength of the seed light; and a dispersion enlargement/reduction element (18) which enlarges or reduces the dispersed optical path.

3. The THz-wave generation apparatus according to claim 2, wherein the dispersion enlargement/reduction element (18) comprises a confocal optical system (20) which collects a light beam passed through a first focal point $f_1$ on a second focal point $f_2$ positioned in an incidence plane of the nonlinear optical crystal.

4. The THz-wave generation apparatus according to claim 3, wherein the confocal optical system (20) comprises a first convex lens system (21*a*) having a focal length $f_1$ and second convex lens system (21*b*) having a focal length $f_2$, the first and second convex lens systems are coaxially positioned at an interval of a sum $f_1+f_2$ of the focal lengths, and thereby the first and second convex lens systems share a focal point position in an intermediate position.

5. The THz-wave generation apparatus according to claim 2, wherein the wavelength dispersion element (17) is a diffraction grating, prism, or combination of these, and the dispersion enlargement/reduction element (18) is a lens, concave surface mirror, parabolic mirror, or combination of these.

6. The THz-wave generation apparatus according to claim 5, wherein the dispersion enlargement/reduction element (18) comprises a confocal optical system (20) which collects a light beam passed through a first focal point f.sub.1 on a second focal point f.sub.2 positioned in an incidence plane of the nonlinear optical crystal.

7. A tuning method of a THz-wave generation apparatus for allowing a pump light (2) to be incident upon a nonlinear optical crystal (1) which can generate a THz wave by a parametric effect and for generating an idler light (3) and THz wave (4) in a direction in which a non-collinear phase matching condition is satisfied, the method comprising the steps of:

injecting the seed light (5) having a variable frequency in a generation direction of the idler light; and combining a wavelength dispersion element (17) for dispersing an optical path of the seed light because of a difference of a wavelength of the seed light with a dispersion enlargement/reduction element (18) for enlarging or reducing the dispersed optical path to constitute angle dispersion compensation means (16) so that an incidence angle $\theta_{IN}$ of the seed light upon the nonlinear optical crystal (1) substantially equals to a desired phase matching condition regardless of the wavelength.

* * * * *